(12) United States Patent
Tang et al.

(10) Patent No.: US 7,990,198 B2
(45) Date of Patent: *Aug. 2, 2011

(54) APPARATUS AND METHOD FOR GENERATING CLOCK SIGNAL

(75) Inventors: Sen-Huang Tang, Hsinchu (TW); Wen-Chung Lai, Taipei (TW)

(73) Assignee: Realtek Semiconductor Corp., Hsinchu (TW)

(*) Notice: Subject to any disclaimer, the term of this patent is extended or adjusted under 35 U.S.C. 154(b) by 222 days.

This patent is subject to a terminal disclaimer.

(21) Appl. No.: 12/488,889

(22) Filed: Jun. 22, 2009

(65) Prior Publication Data

US 2009/0256614 A1   Oct. 15, 2009

Related U.S. Application Data

(63) Continuation of application No. 11/818,034, filed on Jun. 13, 2007, now Pat. No. 7,567,108, which is a continuation-in-part of application No. 11/035,086, filed on Jan. 13, 2005, now abandoned.

(30) Foreign Application Priority Data

Jan. 16, 2004   (TW) .............................. 93101101 A

(51) Int. Cl.
*G06F 1/04*   (2006.01)
(52) U.S. Cl. ........................................ 327/291; 327/293
(58) Field of Classification Search .................. 327/291, 327/293, 294, 298, 299, 115, 118, 165–169
See application file for complete search history.

(56) References Cited

U.S. PATENT DOCUMENTS

| | | | |
|---|---|---|---|
| 4,354,164 A | | 10/1982 | Gupta |
| 5,038,117 A | | 8/1991 | Miller |
| 5,282,223 A | | 1/1994 | Muramatsu |
| 5,365,119 A | | 11/1994 | Kivari |
| 5,504,751 A | | 4/1996 | Ledzius et al. |
| 5,506,878 A | | 4/1996 | Chiang |
| 5,610,561 A | | 3/1997 | Zarrabian |
| 5,694,066 A | | 12/1997 | Shyong |
| 5,781,049 A | | 7/1998 | Fugo |
| 5,854,576 A | | 12/1998 | Swan |
| 5,955,905 A | | 9/1999 | Idei et al. |
| 6,064,252 A | * | 5/2000 | Nara .............................. 327/544 |
| 6,107,846 A | | 8/2000 | Shinmori |
| 6,137,332 A | | 10/2000 | Inoue et al. |
| 6,380,776 B1 | | 4/2002 | Yocom |
| 6,392,455 B1 | | 5/2002 | Yarborough, Jr. |
| 6,396,314 B1 | | 5/2002 | Roth |
| 6,469,549 B2 | | 10/2002 | Carson et al. |
| 6,661,261 B2 | | 12/2003 | Tam et al. |
| 6,876,236 B2 | | 4/2005 | Aman |
| 6,956,922 B2 | | 10/2005 | Weldon et al. |
| 7,016,284 B2 | | 3/2006 | Chou |
| 7,106,118 B2 | | 9/2006 | Tang et al. |
| 7,209,534 B2 | | 4/2007 | Lewis |
| 7,567,108 B2 | * | 7/2009 | Tang et al. ..................... 327/291 |

* cited by examiner

*Primary Examiner* — Hai L Nguyen
(74) *Attorney, Agent, or Firm* — Thomas, Kayden, Horstemeyer & Risley, LLP

(57) ABSTRACT

The invention is related to an apparatus and a method for generating an output clock. The method comprises: receiving a transmitted signal comprising at least one data signal and at least one synchronized signal; producing a reference signal according to the synchronization signal; counting the first reference signal according to a free-run clock outputted by a free-run clock generator to produce a counter signal; and generating the output clock according to the counter signal and the free-run clock.

19 Claims, 4 Drawing Sheets

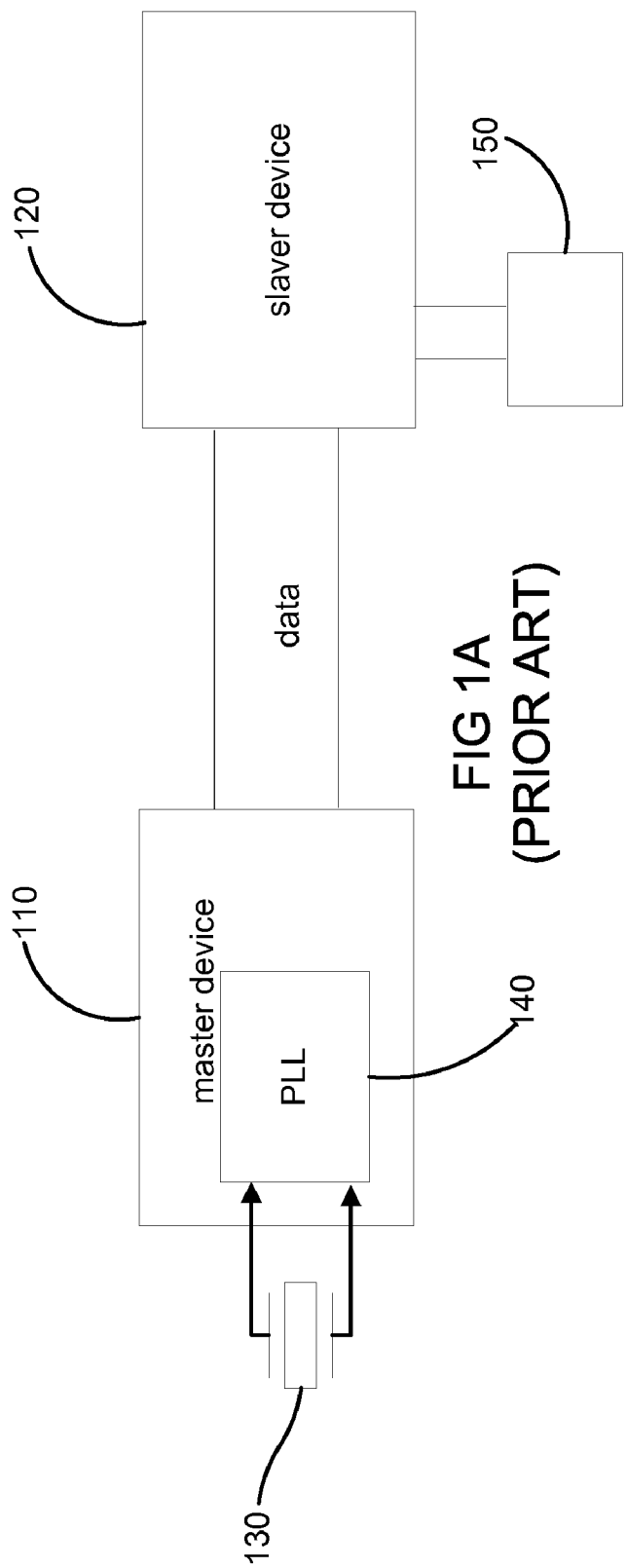
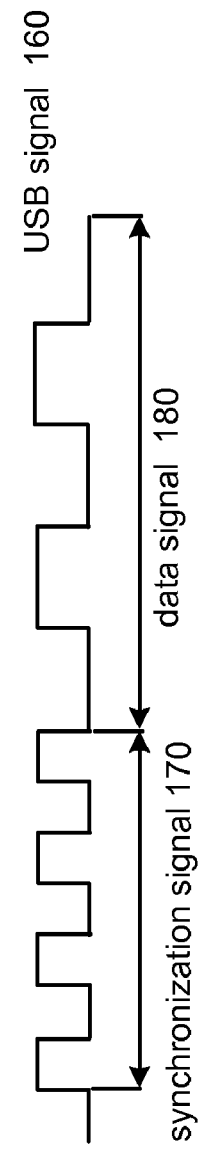
FIG 1A (PRIOR ART)
FIG 1B (PRIOR ART)

APPARATUS AND METHOD FOR GENERATING CLOCK SIGNAL

CROSS REFERENCE APPLICATIONS

This application is a continuation of U.S. application Ser. No. 11/818,034, filed on Jun. 13, 2007, now U.S. Pat. No. 7,567,108 B2 issued on Jul. 28, 2009, which is a continuation-in-part (CIP) application of U.S. application Ser. No. 11/035,086 filed on Jan. 13, 2005 (now abandoned), which claimed the benefit of Taiwan application serial no. 93101101, filed on Jan. 16, 2004, all of which are incorporated herein by reference.

BACKGROUND OF INVENTION

1. Field of the Invention

This invention relates to an apparatus and a method for generating an output clock signal, particularly relates to an apparatus and a method for generating an output clock signal using an internal clock signal.

2. Description of the Prior Art

A Serial interface, such as an $I^2C$ interface, PCI Express, and Universal Serial Bus (USB), is a common interface for data transmission. The $I^2C$ interface comprises a data line and a clock line. The USB interface comprises two data lines, Data+ and Data−, and two power lines, Vdd and Gnd. These two data lines Data+ and Data− are differential signals.

Please refer to FIG. 1A; FIG. 1A shows a block diagram of the structure of a serial data communication using the serial interface. Please refer to FIG. 1A. The structure of the serial signal communication comprises a master device 110 and a slayer device 120. The master device 110 and the slayer device 120 are reference to a reference clock. The reference clock can be provided by a precise crystal oscillator 150 or be generated by an external crystal oscillator 130 and input into an internal phase-lock loop (PLL) 140. Conventionally, because frequency errors of the reference clocks could not be avoided, the reference clocks of the conventional master device 110 and the conventional slayer device 120 could not be exactly the same and synchronized. In the $I^2C$ interface, the $I^2C$ interface includes the clock link for transferring the reference clock from the master device 110 to the slave device 120 such that the master device 110 and the slave device 120 can be synchronization. In a USB, the USB signal contains a data signal and a synchronization signal such that the master device and the slave device can be synchronization according to the synchronization signal.

FIG. 1B shows the waveform of a USB signal. The USB signal 160 comprises a synchronization signal 170 and a data signal 180. When the USB receiver, such as the slayer device 120, receives the synchronization signal 170, the USB receiver compensates the sampling frequency of the received data signal 180 to avoid errors. In $I^2C$, the $I^2C$ receiver uses the clock signal of the clock line as a reference to determine the sampling frequency of the data signal of the data line.

The conventional serial interface requires an external crystal oscillator. In additions, the reference clock frequencies of the conventional master device 110 and the slayer device 120 are not exactly the same.

Therefore, this invention provides a method and apparatus to generate a clock signal, wherein an external crystal oscillator is not required and the frequency of the clock signal is substantially the same as the frequency of the clock signal generated by a remote serial transmitting device.

Shinmori (U.S. Pat. No. 6,107,846) discloses a frequency multiplication circuit which is able to generate an output signal having a frequency obtained by multiplying an input external clock signal (see lines 1.about.3 of ABSTRACT of Shinmori). The frequency of the output signal is multiple times of that of the input external clock signal, and therefore the period of the output signal definitely is NOT the same as the period of the input external clock signal. Moreover, from the FIGS. 2, 4, 6 and 8 of Shinmori (not shown here), it can be seen that the output signal CLK2 contains uneven duty cycles due to the fact that, the reference clock signal CLK0 is output as the output signal CLK2 only when the output terminal Q2 is at an active level, and a low signal will be output as the output signal CLK2 when the output terminal Q2 is at an inactive level. Therefore, part of the duty cycles of the output signal CLK2 are equal to the duty cycles of reference clock signal CLK0, but some others are not. That is, the frequency multiplication circuit disclosed by Shinmori is merely a frequency multiplying circuit that is capable of generating an output signal having a frequency that is N-times as high as the input external clock signal. However, Shinmori does not disclose, teach nor suggest an apparatus to generate a clock signal as which disclosed in the present invention that, wherein the external crystal oscillator is not required and the frequency and duty cycle of the input clock signal is substantially the same as the frequency and duty cycle of the output clock signal generated by the apparatus.

SUMMARY OF INVENTION

It is therefore one of the objectives of the claimed invention to provide an apparatus and method for generating an output clock without an external reference clock.

According to the invention, the method for generating an output clock comprises: receiving a transmitted signal comprising at least one data signal and at least one synchronization signal; producing a reference signal according to the synchronization signal; measuring the reference clock according to a second reference clock to generate a measured value; and producing the output clock according to the measured value and the second reference clock.

Preferably, the reference signal is adjusted according to a control signal such that the period of the reference signal is a multiple of that of the synchronization signal or the frequency of the reference signal is a multiple of that of the synchronization signal.

According to the present invention, an apparatus for generating an output clock comprises: a control logic receiving a transmitted signal having at least one data signal and at least one synchronization signal, and generating a reference signal according to the synchronization signal; a measuring unit for counting the reference signal according to a second reference clock to generate a counter signal; and an output unit for generating the output clock according to the counter signal and the second reference clock.

Preferably, the first counter can adjust the reference signal according to a control signal such that the period of the reference signal is a multiple of that of the synchronization signal or the frequency of the reference signal is a multiple of that of the synchronization signal.

These and other objectives of the claimed invention will no doubt become obvious to those of ordinary skill in the art after reading the following detailed description of the preferred embodiment that is illustrated in the various figures and drawings.

BRIEF DESCRIPTION OF THE DRAWINGS

The details of the present invention will be more readily understood from a detailed description of the preferred embodiments taken in conjunction with the following figures.

FIG. 1A shows a block diagram of the structure of a serial data communication using the serial interface;

FIG. 1B shows a waveform of a USB signal;

DETAILED DESCRIPTION

Figure 2:
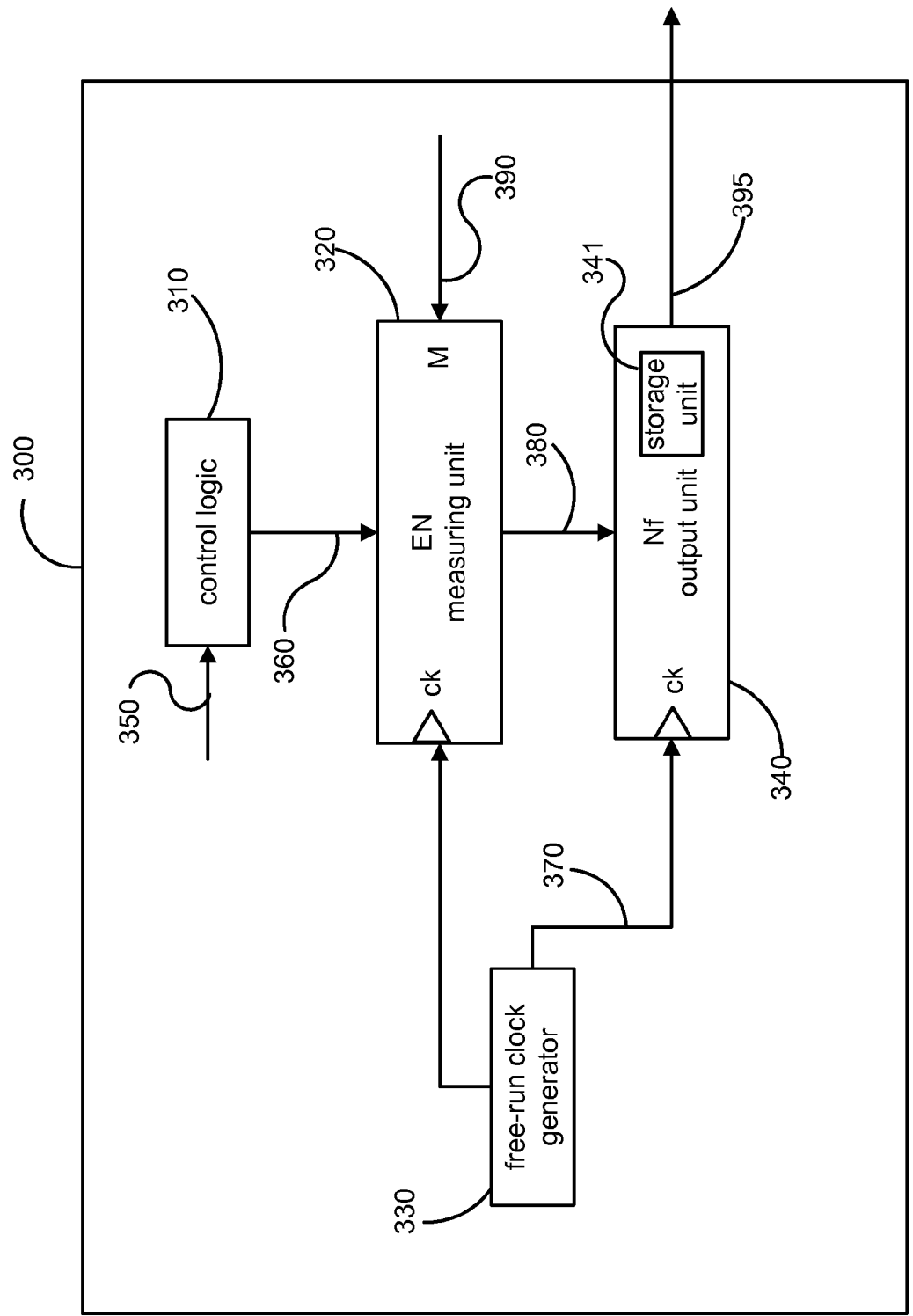
FIG. 2 shows a diagram of an embodiment of a clock generator according to the present invention.

Please refer to FIG. 2. FIG. 2 shows an embodiment of a clock generator according to the present invention. The clock generator 300 comprises a control logic 310, a measuring unit 320, an output unit 340, and a free-run clock generator 330. The control logic 310 can receive a transmitting signal and generate a reference signal 360 according to the synchronization signal 350 of the transmitting signal. The ratio of the period of the reference signal 360 to the period of the synchronization signal 350 can be 1 or any other integers. The ratio of the period of the reference signal 360 and the synchronization signal 350 can also be a non-integer value such as 0.5 or 1.5.

Figure 4:
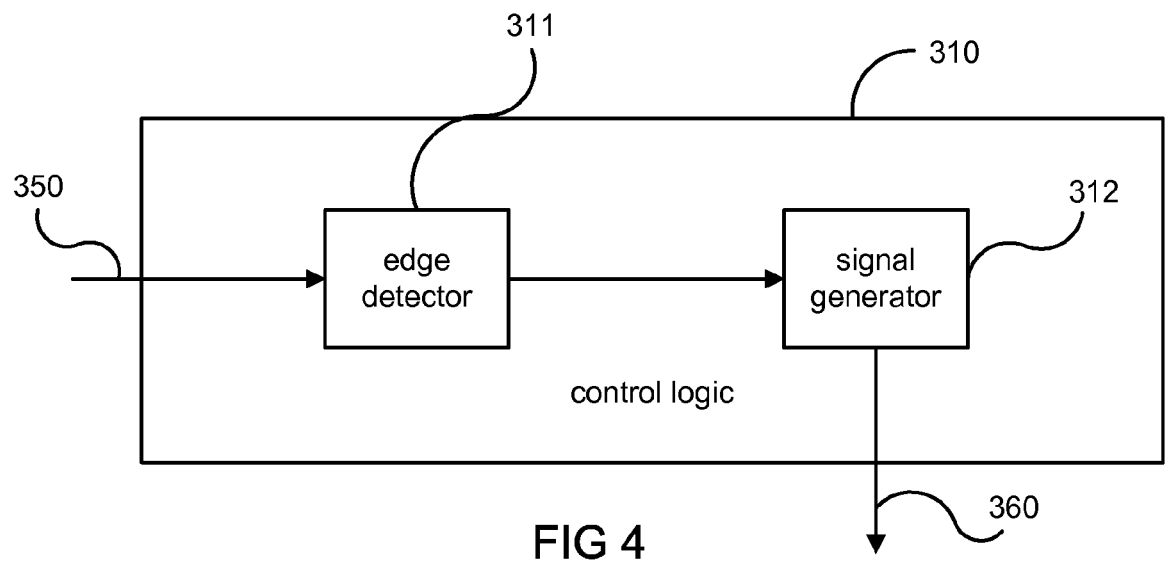
FIG. 4 shows a block diagram of an embodiment of the control logic 310 shown in FIG. 2.

It can be seen in FIG. 1B that, the synchronization signal 170 has a fixed period and is followed by data signal 180, and that such synchronization signal 170 is not easily counted. In order to make a signal that is "countable", that "countable" signal must NOT contain "data signal". Please refer to FIG. 4, which illustrates a block diagram of an embodiment of the control logic 310 shown in FIG. 2. As sown in FIG. 4, one example of the control logic 310 comprises an edge detector 311 and a signal generator 312. By using the edge detector 311 to detect the edges of the waveform of synchronization signal 170, the starting edge and ending edge of the period of a synchronization signal 170 can be found, and thus, the signal generator 312 will be able to generate the reference signal 360 by simply corresponding to multiples of (or exactly the same as) the period of the synchronization signal 170, and such reference signal 360 will contain no data signal at all and is thus countable. In this preferred embodiment, the signal generator 312 further includes a counter therein such that the signal generator 312 is able to generate the reference signal 360 having a period that is "M" times of the period of the synchronization signal 170. Wherein the value "M" can be 1, or other integer, or non-integer. The reason for this invention to make the reference signal 360 having "M" times in period than the synchronization signal 170 is to make the reference signal 360 easier to be counted by the measuring unit 320.

Figure 5:
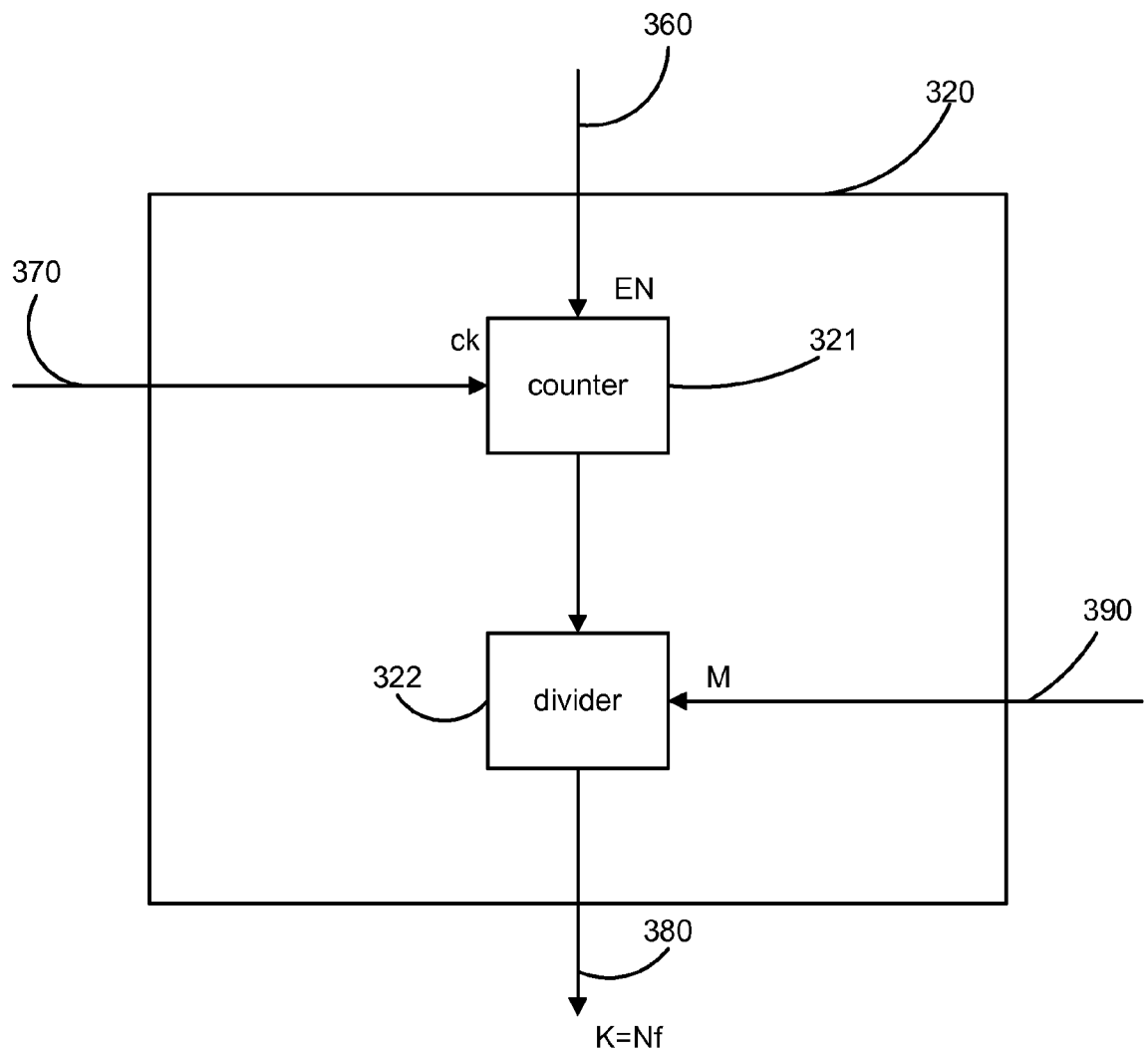
FIG. 5 shows a block diagram of an embodiment of the measuring unit 320 shown in FIG. 2.

Please refer to both FIG. 2 and FIG. 5, an embodiment of the measuring unit 320 comprises a counter 321 and a divider 322. The free-run clock generator 330 generates a free-run clock 370 which is fed to the counter 321 of measuring unit 320. The input of reference signal 360 enables (triggers) the operation of the counter 321 in order to count the reference signal 360 by means of the free-run clock 370. Through counting the reference signal 360 by the counter 321 of the measuring unit 320, (in other words, through measuring the period of the reference signal 360 according to the period of the free-run clock 370), a sub-measured value is obtained. This sub-measured value is then divided by "M" times by the divider 322, wherein the value "M" is fed from the control signal 390 and is corresponding to the ratio of period between the reference signal 360 and synchronization signal 170 as mentioned in the previous paragraph. After divided by the divider 322, the measured value 380 "K" is obtained. The measured value 380 "K" can be an integer or a non-integer. The output unit 340 receives the free-run clock 370 and the measured value 380 and generates an output clock 395. The ratio of the period of the output clock 395 to the period of the free-run clock 370 is equal to the measured value 380 "K". For example, if the period of the free-run clock 370 is Tx and the measured value 380 is K, thus the period of the output clock 395 is K.times.Tx. K can be represented as N.f whereas N and f are integers. In an embodiment, the measuring unit 320 can be implemented by a first counter and the measured value is a counter value. In an embodiment, the output unit 340 can be a second counter.

The following provides a detailed illustration for how does the measuring unit 320 (as shown in FIG. 2) generate a non-integer measured value 380. In the world of electronic circuitries, the measured value 380 is always presented in binary digit format. For example, for a 4-bit counter, the measured value 380 can be varied from 0 ("0000" in binary format) to 15 ("1111" in binary format). The simplest way to divide the measured value by 2 is to right-shift one bit of its binary number. For example, for a measured value equal to 8 ("1000" in binary format), a value of 4 ("100.0" in binary format) will be easily obtained by shifting the rightmost digit of its binary number to be located at the right side of the decimal point (please note that this is not really to "shift" the signal, but is only shifting the rightmost bit to the right side of the decimal point "."). Such prior art operation is similar to divide the value 8 by 2 so as to obtain the result of 4.

Of course, if somebody wants to divide 8 by 4, then he/she only needs to right-shift the binary digits for 2 digits, and then the value 4 ("10.00" in binary format) will be obtained. Moreover, for dividing a measured value 15 ("1111" in binary format) by 2, the result will be 7.5 ("111.1" in binary format, where the rightmost digit "1" located at the right side of decimal point is considered to be equal to 0.5). Therefore, it is obvious that the measuring unit 320 is able to generate a non-integer measured value 380 by means of counter 321 and divider 322. That is, the measured value 380 "K" can be represented as N.f whereas N and f are integers, and the symbol "." is a decimal point. The symbol "N.f" means a non-integer value in binary format. As shown in FIG. 2 and its corresponding description, the reason for the present invention to present the measured value 380 "K" as "N.f" is due to the fact that there is a "ratio" between the period of the reference signal 360 and the synchronization signal 350. And, if the ratio between reference signal 360 and synchronization signal 350 is 2, then the sub-measured value should be divided by 2 in order to obtain the measured value 380 "K=N.f" (that is, to right-shift one digit of its binary number), etc.

The frequency of the free-run clock 370 generated by the free-run generator 330 is independent on that of the synchronization signal 350. Through the mechanism illustrated previously, the output clock 395 generated by the clock generator 300 of the present invention is corresponding to the synchronization signal 350. The synchronization signal 350 can be the synchronization signal for the USB interface or the clock signal for the I2C interface.

In another embodiment, the control logic 310 or the measuring unit 320 can receive a control signal 390 and adjust the period of the reference signal 360 according to the control signal 390. For example, if the value of the control signal 390 is "M", the measured value 380 should be equal to KIM to match the counting range of the measuring unit 320. The value "M" of the control signal 390 can be a positive integer or a positive fraction.

In a preferred embodiment, the output unit 340 includes a storage unit 341 for storing the measured value 380.

Figure 3:
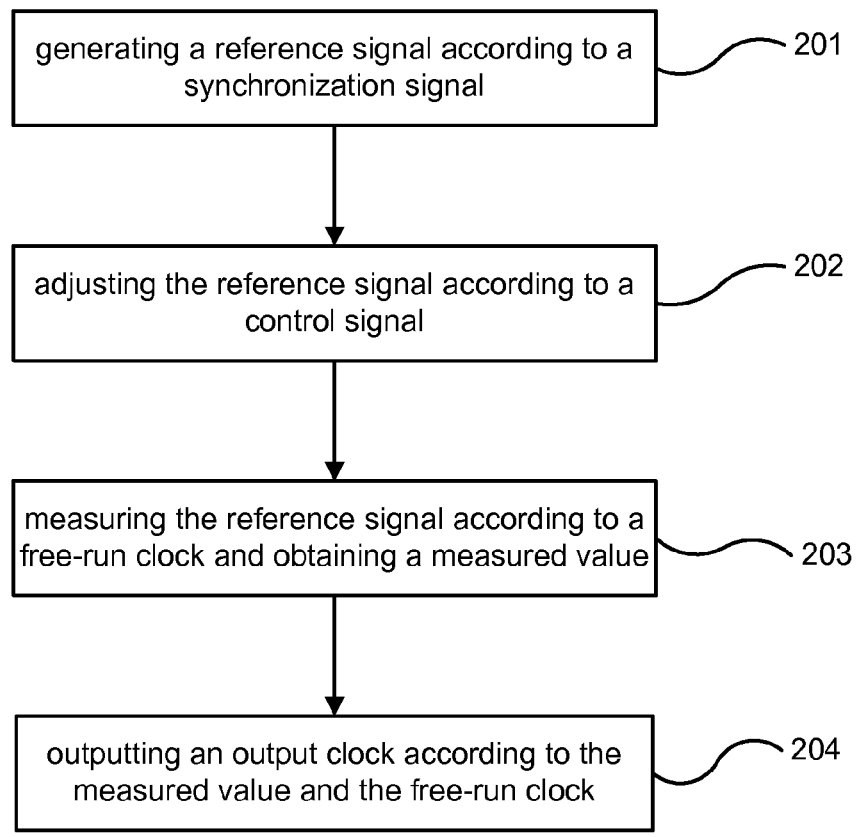
FIG. 3 shows a flowchart of an embodiment of a method for generating an output clock according to the present invention.

Please refer to FIG. 3; FIG. 3 shows a flowchart of generating an output clock of an embodiment of the present invention. The method comprises the step of:

In step 201, a reference signal 360 is generated according to a synchronization signal 350. The ratio of the period of the reference signal 360 to that of the synchronization signal 350 is a positive value, such as 2 or 2.5.

In step 202, the reference signal 360 is adjusted according to the control signal 390. Users can adjust the period of the reference signal 360 by controlling the control signal 390. Of course, this step 202 can be omitted.

In step 203, a counter value K (the measured value 380) is obtained by measuring (counting) the reference signal 360 according to the free-run clock 370. The free-run clock 370 is generated by the free-run clock generator 330. The counter value K can be a non-integer.

In step 204, an output clock 395 is outputted according to the measured value 380 and the free-run clock 370.

In other words, the period of the output clock 395 is K times of that of the free-run clock 370 generated by the free-run clock generator 330. Such that, the period of output clock 395 is substantially the same as the period of the synchronization signal 350. Moreover, because the output clock 395 is obtained by multiplying the period of the free-run clock 370 which is a continuous clock signal and has substantially uniformed duty cycles, as a result, the output clock 395 is also a continuous clock signal having substantially uniformed duty cycles.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. An apparatus for generating an output clock, comprising:
   a control logic utilized for receiving a transmitted signal having at least one data segment and at least one synchronization signal, and generating a reference signal according to the synchronization signal;
   a free-run clock generator for generating a clock signal
   a measuring unit, coupled to the control logic, for generating a measured signal according to the reference signal and the clock signal; and
   an output unit, coupled to the measuring unit, for generating the output clock according to the measured signal and the clock signal.

2. The apparatus of claim 1, wherein, the control logic further comprises an edge detector for detecting edges of waveform of the synchronization signal and a signal generator for generating the reference signal; and
   wherein, the measuring unit further comprises a counter and a divider, said counter is for counting the reference signal by means of the free-run clock.

3. The apparatus of claim 1, wherein the period of the reference signal is a multiple of the period of the synchronization signal.

4. The apparatus of claim 1, wherein the output circuit comprises a storage unit for storing the measured signal.

5. The apparatus of claim 1, wherein the control logic modifies the period of the reference signal according to a control signal.

6. The apparatus of claim 1, wherein the measured signal is a non-integer.

7. The apparatus of claim 1, wherein the clock signal and the synchronization signal are independent;
   a period of the output clock is multiple times of that of the clock signal;
   the period of the output clock is substantially the same as the period of the synchronization signal; and
   the output clock has substantially uniformed duty cycles.

8. An apparatus for generating an output signal, comprising:
   a measuring unit utilized for measuring a serial signal according to a clock signal to generate a measured signal, the serial signal comprising a synchronization signal and at least one data segment; and
   an output circuit, coupled to the measuring unit, for receiving the measured signal and the clock signal and producing the output signal according to the measured signal and the clock signal;
   wherein, a period of the output signal is multiple times of that of the clock signal;
   the period of the output signal is substantially the same as a period of the synchronization signal;
   the output signal has substantially uniformed duty cycles; and
   the clock signal and the synchronization signal are independent.

9. The apparatus of claim 8, wherein the output circuit comprises a storage unit for storing the measured signal.

10. The apparatus of claim 8, wherein the measured signal is a non-integer.

11. The apparatus of claim 8, wherein the measuring unit comprises a first counter and a divider.

12. The apparatus of claim 11, wherein the output circuit comprises a second counter.

13. A method for generating an output clock, comprising:
   producing a reference signal according to a synchronization signal of a received signal, the received signal comprising the synchronization signal and at least one data segment;
   generating a clock signal from a free-run clock generator;
   measuring the reference signal according to the clock signal to generate a measured value; and
   producing the output clock according to the measured value and the clock signal.

14. The method of claim 13, wherein the measuring step comprises:
   counting the reference signal according to the clock signal to generate the measure value.

15. The method of claim 13, wherein the period of the reference signal is a multiple of the period of the synchronization signal.

16. The method of claim 13, wherein the reference signal is generated according to the synchronization signal and a control signal.

17. The method of claim 13, wherein the frequencies of the reference signal and the synchronization signal are substantially the same.

18. The method of claim 13, wherein the reference signal is corresponding to the synchronization signal.

19. The method of claim 13, wherein the clock signal and the synchronization signal are independent; a period of the output clock is multiple times of that of the clock signal; the period of the output clock is substantially the same as the period of the synchronization signal; and the output clock has substantially uniformed duty cycles.

* * * * *